(12) United States Patent
Berka (10) Patent No.: US 6,275,813 B1
(45) Date of Patent: Aug. 14, 2001

(54) METHOD AND DEVICE FOR POSTING FINANCIAL TRANSACTIONS IN COMPUTERIZED ACCOUNTING SYSTEMS

(76) Inventor: George B. Berka, Na Neklance 7, 15000 Prague 5 (CS)

( * ) Notice: Subject to any disclaimer, the term of this patent is extended or adjusted under 35 U.S.C. 154(b) by 0 days.

(21) Appl. No.: 08/692,966

(22) Filed: Aug. 7, 1996

Related U.S. Application Data (63) Continuation of application No. 08/359,003, filed on Dec. 16, 1994, now abandoned, which is a continuation of application No. 08/051,487, filed on Apr. 22, 1993, now abandoned.

(51) Int. Cl.$^7$ .................................................. G06F 17/60
(52) U.S. Cl. .............................................................. 705/30
(58) Field of Search ................................... 395/201, 230, 395/233, 235; 364/705.06, 709.04, 710.04; 235/425; 283/64.1, 66.1; 705/1, 30, 33, 35; 708/110, 134, 163

(56) References Cited

U.S. PATENT DOCUMENTS

| | | | |
|---|---|---|---|
| 4,642,767 | * | 2/1987 | Lerner . |
| 5,117,356 | * | 5/1992 | Marks . |
| 5,189,608 | * | 2/1993 | Lyons et al. . |
| 5,193,055 | * | 3/1993 | Brown et al. . |
| 5,317,504 | * | 5/1994 | Nakayama . |
| 5,390,113 | * | 2/1995 | Sampson . |

OTHER PUBLICATIONS

Business Programs for TRS–80 Model I/III, Charles D. Sternberg, 1980, pp. 1–3, 5–46 and 261–264.

* cited by examiner

*Primary Examiner*—Robert A. Weinhardt
(74) *Attorney, Agent, or Firm*—Michael J. Striker (57) ABSTRACT

The transcription software records actual transactions as transfers of money between two of five accounting categories of income (I), expenses (E), assets (A), liabilities (L) and capital (C). Example: 1823.15, A<I.

The directional graphic character "<" visually indicates the direction of transfer between a user-input source and a destination category and always points at the destination category, thus assisting the user in posting the actual transactions.

Since the destination is identical with the debit category, and the source with the credit category, the computer automatically posts the amount, in a fully computerized ledger-creating program, on proper debit and credit accounts.

In a modification, a plurality of account titles are assigned to each of the four basic categories (I, E, A, L), and each title includes a numeric identifier and a descriptive name. The first digit in the identifier denotes a category and the remaining digits denote an account number. For example, the directional record "1823.15,300 A<I 100" represents the transfer of 1823.15 from account "100 Various Income" to account "300 Various Assets". The directional records are stored in a journal file, while the account titles are stored in an account list file. A single account title "500C Capital" is assigned by the program to the category of capital.

The program also includes checking steps that inhibit the entry of invalid data.

4 Claims, 4 Drawing Sheets

METHOD AND DEVICE FOR POSTING FINANCIAL TRANSACTIONS IN COMPUTERIZED ACCOUNTING SYSTEMS

This is a continuation of application Ser. No. 08/359,003 filed Dec. 16, 1994, now abandoned, which in turn is a continuation of application Ser. No. 08/051,487 filed Apr. 22, 1993, now abandoned.

BACKGROUND OF THE INVENTION

The present invention relates to a computerized system of double-entry financial accounting and, in particular, to a method of entering data from financial transactions into a computer program that posts the entered information according to the known accounting theory of debit and credit. In accounting the term "posting" means transferring the debits and credits from the journal to the general ledger.

In prior art computerized financial accounting methods, the accuracy of posting of financial data into an accounting program depended on the degree of the operator's accounting knowledge. For example, when posting a financial transaction into known accounting programs, the operator had to memorize that debiting an account increases assets or expenses and decreases liabilities, whereas crediting an account decreases assets or expenses and increases liabilities or income. Evidently, when dealing with a larger number of different accounts, the entries are error-prone and, especially for a non-accountant, the errors are difficult to detect.

It is, therefore, an object of the present invention to provide a new posting method which, in combination with a computer program, avoids the disadvantages of prior art accounting systems.

In particular, an object of the invention is to provide a method of recording financial transactions both in a book of original entry and in the computer in a way that guides the operator to make an obviously correct posting decision without the need of memorizing the debit and credit theory.

Another object of the invention is to improve the detectability and correctability of accounting errors.

A further object of the invention is to substantially expedite the actual entry of accounting data into the computer.

SUMMARY OF THE INVENTION

The invention is based on the fact that any financial transaction can be defined by a single posting record that includes, apart from its reference number, date, currency and monetary amount, a categoric directional code consisting of a destination category and a source category. Preferably, the destination and source categories are separated by a direction indicating graphic character, such as an arrow "<" pointing from the source side (where the amount cones from) to the destination aide (where the amount goes to) in the transaction. The two categories are selected from the four basic accounting categories (ctg) of income (I), expenses (E), assets (A) and liabilities (L), whereby the source category always indicates the credit side (the right side), and the destination category the debit side (the left side) of the assigned T-account in the general ledger. In this way, the categoric directional code in the form "destination ctg symbol<source ctg symbol" is prepared to visually indicate not only the direction of transfer of money in a transaction, but also the posting of the amount in a corresponding T-account.

According to one feature of the method of the invention, a descriptive directional code in the form "destination ctg symbol and account name<source account name and ctg symbol," is first hand-written into a book or journal of original entry, and verified by means of a verification table. A numeric directional code is then derived from the descriptive code. The numeric directional code has the form "destination account number<source account number," whereby the first digit of each of the two account numbers is correlated to the corresponding category and the remaining digits are correlated to the corresponding account name in the descriptive code.

The complete posting record, which is hand-written in the book of original entry, has the form "reference no. and date, amount and currency symbol, and the numeric directional code." In this form, it is ready for being copied into the computer. In practice, it is of advantage when the record of a financial transaction in the book, apart from the aforementioned descriptive code, also contains an optional description of attributes of the transaction. The descriptive code and/or notes remain in the book only and are not transcribed into the computer.

According to another feature of the invention, a transcription program guides the user to enter into the computer only those directional posting records that have the prescribed format. The transcription program automatically creates a database or journal file that stores the directional posting records pertaining to a given time period. It is advantageous for the proper traceability of the posting records that any additions, deletions and other changes in the database file be first executed in the book of original entry and only then entered into the computer by the aforementioned transcription program.

According to still another feature of the invention, the transcription program automatically creates in the computer an elementary account list file containing the titles (i.e. the account numbers and names) of four basic accounts numbered 100, 200, 300 and 400 whose first digit is correlated to one of the four accounting categories.

Once a categoric or a descriptive directional code of a transaction has been determined and noted in the book of original entry, the operator routinely selects, by means of a below described account directory, the numbers of destination and source accounts to be employed in the numeric directional code. An account directory containing the account names and numbers, is updated by the operator after a new descriptive account name has been recorded in the book. By means of an account list update program, the operator then enters the account names and numbers (or supplements the names of all new accounts) under corresponding categories into an account list file in the computer.

BRIEF DESCRIPTION OF THE DRAWINGS

In the following description, an example of specific embodiment of the invention will be described in connection with the accompanying drawings, wherein.

DESCRIPTION OF THE PREFERRED EMBODIMENTS

Figure 1:
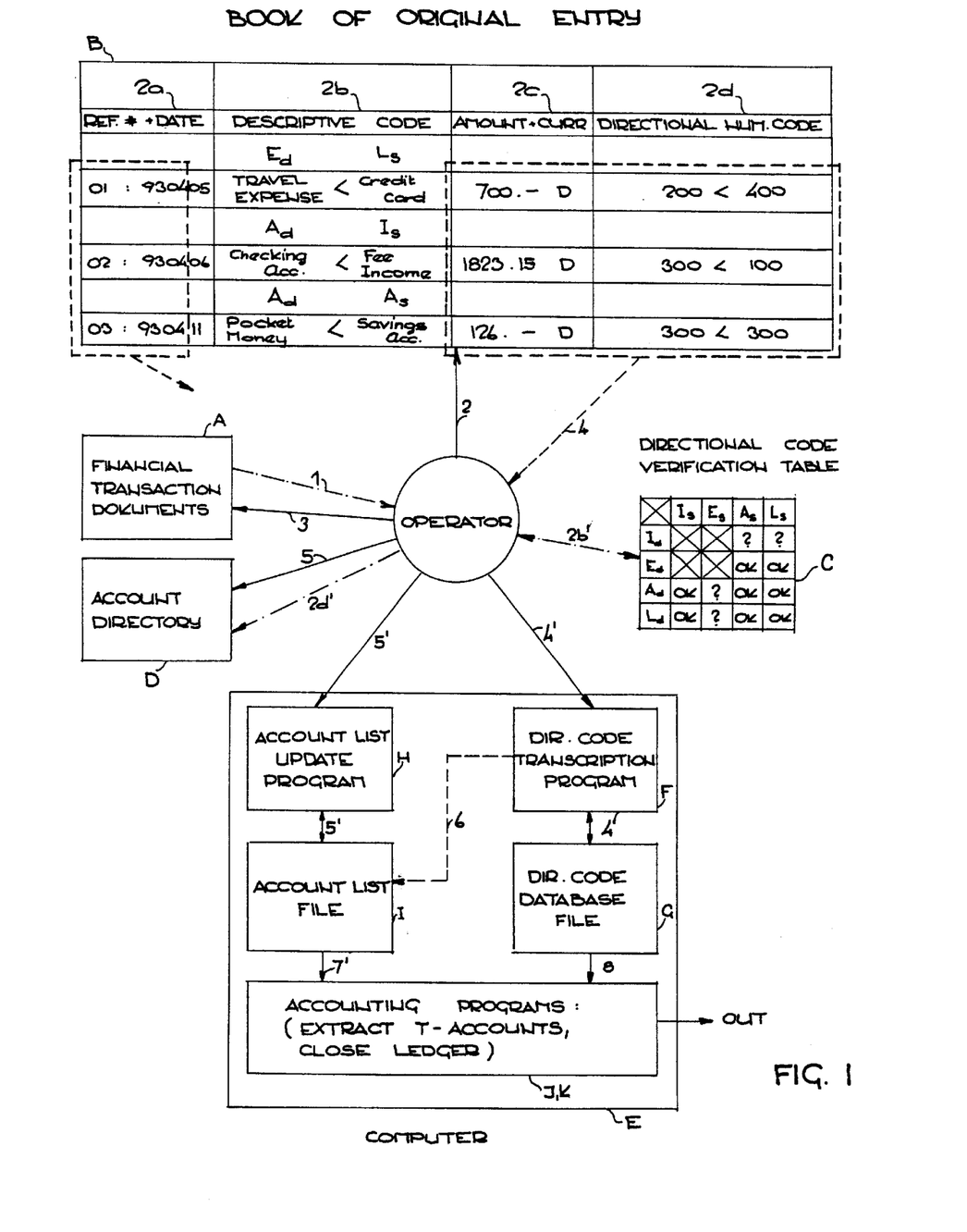
FIG. 1 shows schematically a book (or journal) of original entry for keeping chronological records of financial transactions in a prescribed coded format, and a commuter programmed for executing the method of the invention.

Referring to FIG. 1, accounting papers documenting individual financial transactions to be processed are stacked in block A. Preferably, these documents are presorted and arranged alphabetically according to their titles from which with advantage, the account names in the account directory are derived.

In manipulative steps indicated by arrows 1–5, 2b', 2d', 4' and 5', the operator evaluates (step 1) each document, compares its title (step 2d) with the account directory D and, if a new account title is involved, in step 5 manually writes the new account title into the respective numeric and alphabetic parts of the directory, as it will be described later.

Then, in step 2, the date and the descriptive code of the transaction are manually transcribed from the document A into the fields 2a and 2b of the Journal or book of original entry B.

According to one feature of the invention, the records in fields 2a, 2c and 2d of book B have a prescribed format resulting in a single posting record whose mandatory parts, enclosed in dashed boxes, are transcribed manipulative steps 4' and 5') into computer E. In column 2a, the operator fills in reference numbers; (ordinal numbers of the records separated by a colon (:) from the date of the transaction. In the shown format of the date, the first pair of digits denotes the year, the second pair the month and the third pair of digits denotes the day. However, in this example the day is not a part of the reference number in the electronic database file G.

In the auxiliary second column 2b, the operator writes a descriptive directional code which contains, on the left side of the directional sign "<", the name of the destination account. On the right side of the sign "<", the name of the source account is noted. The descriptive code serves as a visual representation of the direction of flow of money between two accounts participating in a financial transaction. Then the operator determines to which of the four basic accounting categories the source and destination account titles belong. For the sake of a check-up in a verification table, subscripted initial letters (Id, Ed, Ad, Ld and Is, Es, As, Ls) of selected categories are marked at the appropriate sides of the directional sign.

In step 2b', the operator can verify, by means of a code verification table C, the legality of the resulting combination of destination and source categories.

It will be noted that in accounting, the categories "income" and "expenses" must affect the categories "assets" and "liabilities." Therefore, financial transactions whose descriptive code does not contain at least one category "A" or "L" (such as "Income<Income" or "Income<Expenses" or "Expenses<Income" or "Expenses<Expenses") are not permitted and are designated as illegal ("i") by the code transcription program. Moreover, financial transactions of the type "Income<Assets" or "Income<Liabilities" or "Assets<Expenses" or "Liabilities<Expenses" are not real financial transactions because the category "income" cannot be at the destination side, and the category "expenses" cannot occur at the source side. However, the latter combinations of the directional code can be tolerated in the special case of a correction of an accounting error when an incorrectly entered previous transaction is to be neutralized by an identical entry in reverted order. The transcription program marks the reverted code by "s", while in the verification table C, the reverted code is represented by "?". In the system of the invention, a better way of making a correction is to cross-out (without erasing) the incorrect record in the book of original entry B and erase the corresponding posting record in the database G by means of a correction mode of operation of the transcription program F. The remaining combinations of the directional code in table C are acceptable.

The categoric posting decision in the field or column 2b is critical for accounting accuracy, but requires only rudimentary accounting knowledge on the part of the operator, namely the meaning of the four basic accounting categories of income, expenses, assets and liabilities. Similarly, the decision concerning the direction of flow of money in a financial transaction poses no problem, since it is obvious even to non-accountants. For example, in the transaction recorded under reference number 01;9304, the money for the travel expense (destination ctg is Ed) comes from a dobt (credit card) and hence the source ctg is Ls. Table C confirm, that combination "Ed<As" is acceptable (O.K.) and so are the combinations "Ad<Is" and "Ad<As", determined in the second and third recorded transactions.

In the mandatory third field or column 2c, the operator routinely enters the amount followed by the symbol of currency (D=USD, M=DM and the like), while in the mandatory fourth column 2d, he enters the numeric directional code which has the form "destination account number<source account number." The first digit in the account numbers is correlated to an accounting category and the remaining digits are reserved for different accounts within that category. As described before, the account numbers can be routinely located in the account directory D.

In manipulation step 3, the operator marks the reference number and date on the recorded document and starts processing the next document A. After data from all documents pertaining to a given accounting period has been recorded in book B in the manner described above, the operator in steps 4 and 4' copies by means of transcription program F the posting records (indicated by dashed boxes in book B) into a database file G in computer E.

At this point, all accounting work on the part of the operator has been completed and the remaining, most laborious part of accounting, is accomplished automatically by means of accounting programs J and K in computer E.

As indicated by dashed arrow 6, code transcription program F opens account list file I; if no account list file I is present in the computer memory, it automatically creates an elementary account list file I, which contains only four mandatory account titles each including a starting account number along with a cumulative account name assigned to a category.

Actual accounting programs F, H, J and K are listed in appendixes I, II, III and IV. In the following disclosure, references to program steps include a Roman numeral referring to the appendix and Arabic numerals pointing to the program line.

All programs are written in Basic for the "Tandy 102" portable computer operating in connection with "Tandy" portable disk drive. The Basic language key words, alpha-numeric characters, graphic characters and a code interpreter program are built in the ROM (Read Only memory) of "Tandy 102".

By the effect of program lines I/3, I/9, I/10, I/48, I/49, I/59, I/62, I63, I/64 and I/50, the account titles read as follows: "100I, Various Income", "200E, Various Expenditures", "300A, Various Assets" and "400L, Various Liabilities". Even if such an elementary or categoric accounting system having only four cumulative accounts produces correct final results in the closing balance and income statement, in practice it is desirable to divide each accounting category into a number of different account classes (according to budget class names, for example) and into a substantially larger number of subclasses (according to account names, for instance). The various account names or budget class names are selected at the discretion of the user. Preferably, the new account names should resemble those on the transaction documents A, as recorded in the descriptive code in the auxiliary column 2b.

The account list update program H enables the operator to update and maintain the numeric account list file I in the computer. If desired, the program H (appendix II) also sorts alphabetically the numeric account list according to budget class or account names, and stores sorted files in the RAX of the computer. The operator can then reprint these files for use in the account directory book D. The book D has an alphabetic part and a numeric part. The alphabetic part corresponds to the sorted account title list file "ALTyy.DO", stored in the RAM. It is intentionally arranged similarly to a telephone directory in order to aid the operator in selecting an account number.

The numeric part of the directory D corresponds to the numeric account list file "ALNyy.DO". The maximum number of accounts in each category depends on the memory capacity and speed of the computer. In the program examples, the maximum account number has been set to 55 accounts per category. Consequently, the program can handle the total number of 220 accounts.

Referring to appendix I, the transcription program F named "TRANSJ.BA" facilitates the transfer of the posting records from the book of original entry B into database file G of the computer.

The program asks (in steps I/11–15) for the entry of the desired accounting period, e,g. 9304. The first two digits denote the year, while the last two digits denote the month. The program opens (in program steps I/18–22 and I/48–56) a database file "DB9304.DO", a numeric account list file "ALN93.DO", displays on the screen the last posting record retrieved from the database (step I/26), automatically displays on the screen the reference number and date of the next record to be entered (steps I/24 and I/29), and waits for the transcription of the amount and currency data (steps I/31–34 and I/86–87) from column 2c of book B. If the file "ALN93.DO" is absent, the program automatically creates the aforementioned new elementary account list file. If the file "DB9304.DO" is absent, the program is interrupted. Upon entry of the amount and currency from column 2c, the program automatically types on the screen the requisite delimiter (",") and waits for the entry of a user-defined destination account number (step I/89). After a correct entry of the latter, program step I/92 types on the screen the directional graphic character or sign "<" whose tip determines the left debit side for posting the amount in the designated destination T-account. Similarly, program step I/97 waits for the entry of a user-defined source account number and types it opposite the base of the directional arrow sign "<", thus indicating the right credit side for posting the same amount in the designated source T-account.

In the case of an incorrect entry the program erases the defective part and admits only those entries that have the prescribed format. For example, the instructions including the "IF-THEN" commands on lines I/33, I/89 and I/97 insure that the user-input amount is always greater than zero and the user-input destination and source account numbers are within the code range (100–500) of the five accounting categories. In this manner, and together with the directional sign generated on line 92, the program forces the user to post in accordance with the directional posting method of this invention. The complete posting record is then shown on the first line of the screen. On the second line, a corresponding descriptive code containing the account titles is displayed (step I/26). In the event of an entry of a new account number whose name is absent from account list file I, the program automatically enters the reference number and date into the code on the second line (steps I/68 and I/71), followed by "?" to indicate that upon entry into the account list file, the account title is to be completed.

The program "TRANESJ.BA" also verifies the legitimacy of the entered combinations (step I/100) of the destination and source categories. Illegal or dubious combinations of account numbers in the numeric directional codes of database records are marked by symbols "i" or "s", meaning illegal or reverted entries.

In the event that the user discovers an error in the copied data, the program (on lines 31, 34 and 93) enables the correction or deletion of the defective entry in the course of the transcribing operation.

The program H, named "UPDTAL.BA" and listed in appendix II, is designed for an error-free updating of the Account List file. The program H is simple to use, It asks for the entry of a two-digit abbreviation of the year (e.g. 93) and then prompts the user to type in either a single account number or a pair of account numbers. If the operator writes in a single number, the program displays on the screen a batch of records from the account list file, starting with the selected number. The operator then selects a number that is to be corrected, deleted or added.

If a pair of numbers has been typed in, a batch of account records delimited by the two numbers is displayed on the screen The program is terminated by typing in an "X" (Exit). The user also has a choice of sorting the account list according to account titles, budget class names or account numbers. The sorted account list files "ALTyy.DO" or "ALByy.DO" or "ALNyy.DO" appear in the RAM of the computer.

Referring to appendixes III and IV, the programs J and K named "EXTR-T.BA" and "CLOSEL.BA" automatically perform the final accounting work based on data stored in the database and account list files. In this example, the programs are designed for operation on a monthly basis to successively process twelve separate monthly database files, "DByy01.DO" through "DByy12.DO". Both programs always start at the first database "DByy01.DO" and require the December closing balance file "BDyy12.DO" from the preceding annual accounting period, in order to insure a proper transfer of capital.

The program J named "EXTR-T.BA" and listed in appendix III, is designed for extracting T-accounts from successive monthly databases in an annual accounting period to create a set of files, forming the general ledger for that period.

The program first asks in steps III/4, III/13 and III/16 for the entry at the abbreviation of the desired accounting year (egg., 93), then in steps III/5, III/14, III/18–III/21 for the desired account numbers (from 1 to 10 numbers in a run) and finally for the currency (steps III/10, III/22–III/23). The heading of the extracted T-account file starts with the symbol of the selected currency, followed by the full description of the account in accordance with the record in the numeric account list. The records within the T-account are grouped according to successive months. The left side and the right side of the T-account is identical to the posting record retrieved from the database file G, whereby the account number corresponding to that of the current T-account is replaced in steps III/30–40 by an asterisk: ("*"). The monetary amounts of respective records are then arranged in columns opposite the asterisks. The difference of the sum of amounts in the left-hand (debit) column and the right-hand (credit) column shows the turnover. The transferred amount of capital from the preceding accounting period (if any) is added to the turnover and the result is displayed as the balance in the T-account. Example;

m.DO" and a Closing Balance file "Bcyymm.DO" for a period ending with a designated month within an annual accounting period. Accordingly, the designation of the twelfth monthly database results in a closing of the ledger accounts for the whole year.

At the start, it asks for the date of the desired database, then for the currency in which the computations are to be made and finally, whether a preliminary Trial Balance, for use in an account reconciliation procedure, or a final Closing Balance, is desired.

As mentioned before, the program K requires the December closing balance file from the preceding year, the January database file from the current year and the account list file from the current year. If the closing balance file from the preceding annual period is absent, there is an option to continue without the transfer of capital. In this case, the final closing balance file will show the turnovers only. Since the computation is always started with data from January database file of the current year, the program is interrupted if this file is missing. The subsequent data processing phases and their successful completion are indicated on the screen during the run of the program.

The currency symbol appended to the amount is of advantage when the financial transactions are in different currencies. In this case, the program creates separate closing balances and income statements for the indicated currencies. Another feature of the program K is its capability to monitor and indicate accounting errors that may occur in the database records.

Figure 2:
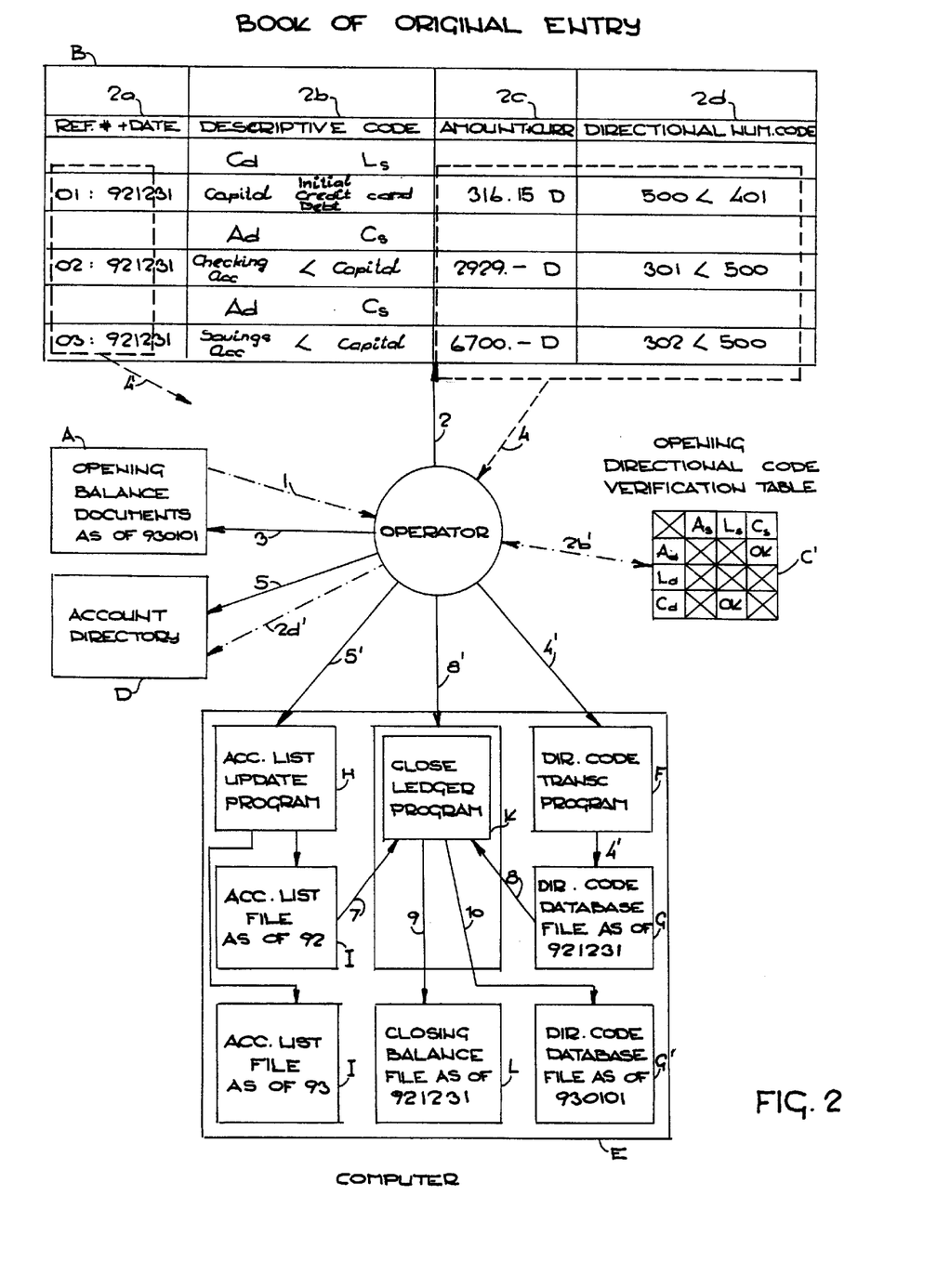
FIGS. 2–4 shows the setup of the book of original entry and of the computer for initiating a financial accounting system, using the posting method of the invention.
Figure 3:
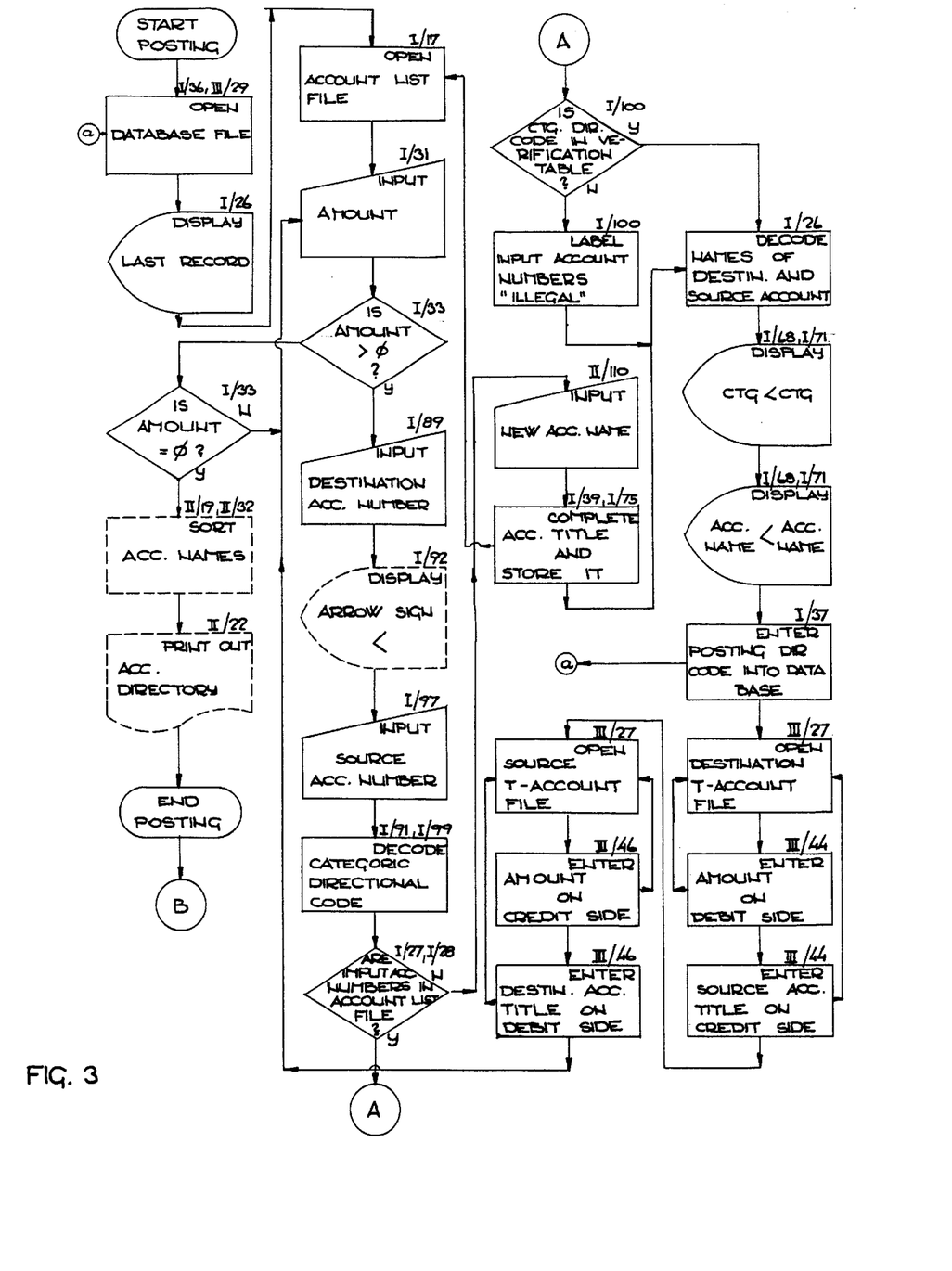
Figure 4:
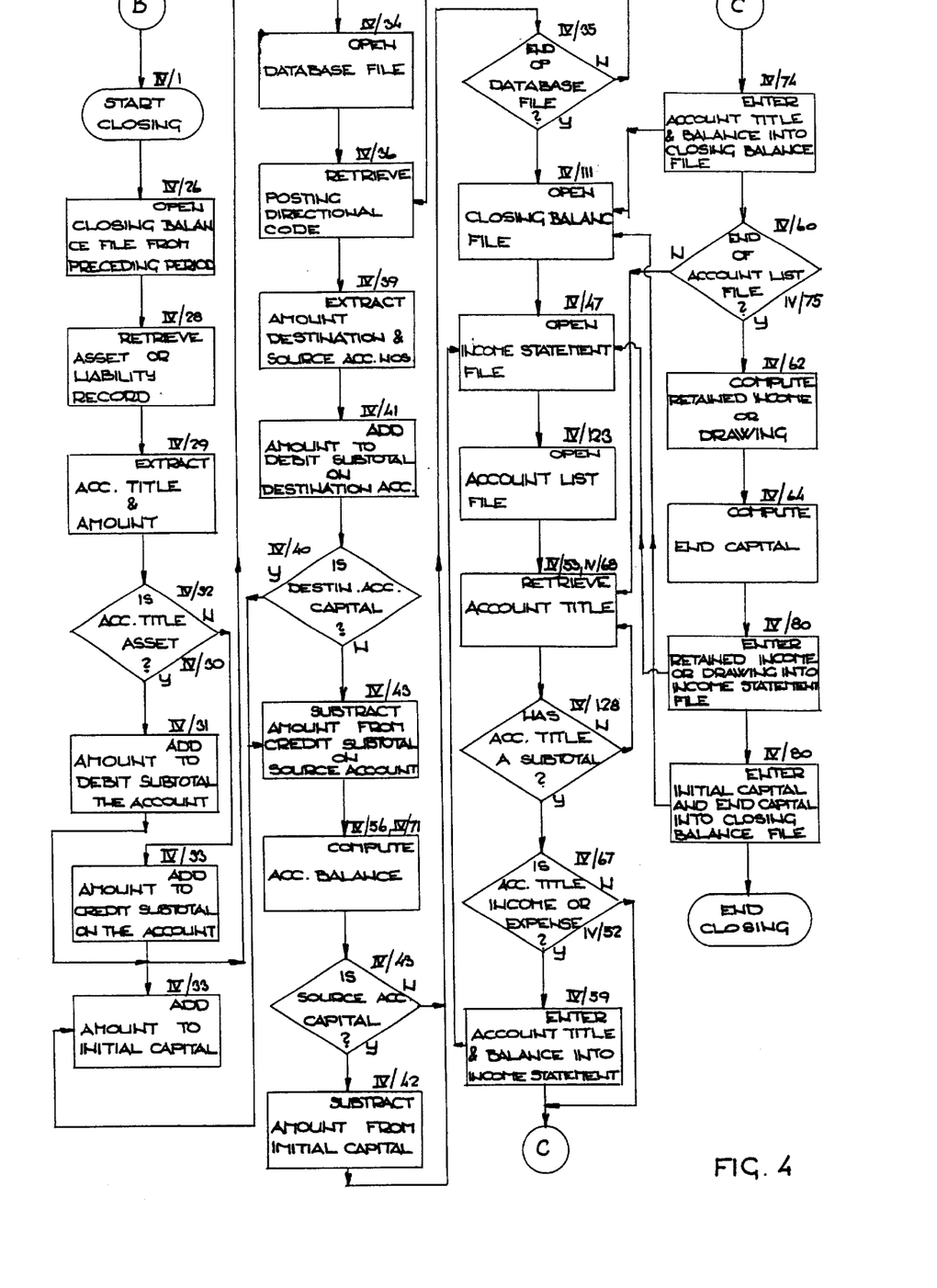

The initiating procedure for the accounting system using the posting method of this invention will be explained with reference to FIG. 2. The arrangement of FIG. 2 is similar to that of FIG. 1, with the exception that a fifth accounting category of Capital (C) is introduced into the opening balance documents A, into the records of book B and into the verification table C'. The category of Capital (C) is not an elementary accounting category, but represents the difference between assets (A) and liabilities (L). In accounting

| D 200I, VARIOUS EXPENSES | | | | D 300A, VARIOUS ASSETS | | | |
|---|---|---|---|---|---|---|---|
| 9304 | | | | 9304 | | | |
| 01: | 700.00 | * < 400L | | 02: | 1823.15 | * < 100I | |
| | 700.00 | Turnover | 0.00 | 03: | | 300A < * | 120.00 |
| | | Balance | 700.00 | 03: | 126.00 | * < 300A | |
| | 700.00 | | 700.00 | | 1949.15 | Turnover | 126.00 |
| | | | | | | Balance | 1823.15 |
| | | | | | 1949.15 | | 1949.15 |

| D 100I, VARIOUS INCOME | | | |
|---|---|---|---|
| 9304 | | | |
| 01: | | 300A < * | 1823.15 |
| | 0.00 | Turnover | 1823.15 |
| | 1823.15 | Balance | |
| | 1823.15 | | 1823.15 |

The reference numbers facilitate a comparison with the book B of original entry.

The program K, "CLOSEL.BA", listed in appendix IV creates a conventional Income Statement file "Zcyymterminology, the category "capital" is also referred to as net worth, owner's equity or proprietorship. It will be seen that the opening verification table C' contains only two valid combinations of the categoric directional code, namely "destination assets<source capital" (Ad<Cs) and "destination capital<source liabilities" (Cd<Ls). The account number 500 is assigned to a single cumulative account named "Capital". This account title does not appear in the account list file I, but it is introduced by program TRANSJ.BA in steps I/90 or I/98 and does appear in the income statement file and the closing balance file.

In the example of the opening balance records in book B of FIG. 2, the posting record under ref. no. 01:9212 defines an opening financial transaction where the amount of 316.15D is transferred from a credit card debt (source liabilities account no. 401) to destination capital account no. 500. Hence, the posting record to be transcribed into the December database file "DB9212.DO" reads "01:9212, 316.15D,500<401". In the following record (ref. no. 02:9212), the initial amount of 2929.-D is transferred from source capital, account no. 500 to destination assets, account no. 301, and the posting record reads "02:9212,2929.-D, 301<500". In manipulative step 41', the posting records are transcribed by means of program F into the December 92 database file "DB9212.DO". In manipulative steps 5 and 5', the new account titles 401L,Credit Card, 301A,Checking Acc and 320A, Savings Acc are manually written into the account directory D, and by means of the program H are entered into the Account List file "ALN92.DO". Then in manipulation step 8', the operator runs the close ledger program "CLOSEL.BA", which in turn creates the December closing balance file "B9212.DO". This file is used as an opening balance file for the January database file "DB9301, DO" in the next accounting period. As explained before, the "CLOSEL.BA" program K is instructed to process the December database and an account list from the preceding year only at the initiation of the accounting system. Once the system has been initiated, the accounting work for all subsequent periods proceeds according to the steps of FIG. 1.

While the invention has been illustrated and described as embodied in specific examples of the computer program for creating and processing the novel posting records, it is not intended to be limited to the details shown, since various modifications and structural changes may be made without departing in any way from the concept of the present invention.

Without further analysis, the foregoing disclosure will so fully reveal the gist of the present invention that others can, by applying current knowledge, readily adapt it for various applications without omitting features that, from the standpoint of prior art, fairly constitute essential characteristics of the generic or specific aspects of this invention.

Appendix I

```
 1 'TRANSJ.BA - TRANSCRIBE JOURNAL
 2 CLS:CLEAR 7000:DEFINT E-U:V=0:F1=0:FL=0:OP=0:SCREEN 0,0:F=55
 3 DIM A$(4,F),B$(4,F),C$(210) :CE$="0:":ON ERROR GOTO 59
 4 Z1$=CHR$(27)+CHR$(112) :Z7$=CHR$(27)+CHR$(113)
 5 Y0$="ENTRY OF DIR-CODE INTO DATABASE"
 6 PRINT@0+(20-LEN(Y0$)/2),Y0$
 7 Z2$="     : yymm,amount+currency,###<###"
 8 Z3$=CHR$(27)+CHR$(75) :Z4$="    Check-up
   ":Z5$="      Maintenance"
 9 A$(1,0)="100I,VARINCOME, !INCOME":
   A$(2,0)="200E,VAREXPENS, !EXPENSES"
10 A$(3,0)="300A,VARASSETS, !ASSETS":
   A$(4,0)="400L,VARLIABIL, !LIABILIT"
11 Z8$="ACCOUNTING PERIOD ...   (yymm)= "
12 Z9$="Wait ..."
13 Y2$="C)ontinue? M)enu"
14 PRINT@80,Z8$;Z3$
15 DA$="":PRINT@(80+LEN(Z8$)),"";:INPUT DA$:IF LEN(DA$) <>4
   OR VAL(DA$)=0 THEN 14
16 RK$=LEFT$ (DA$,2)
17 SC$="ALN"+RK$+".DO":IF OP=0 THEN 48
18 DX$="DB"+DA$+".DO"
19 H$=CE$+DX$:OPEN H$ FOR INPUT AS 1
20 IF EOF(1) THEN CLOSE 1:CLS:GOTO 24
21 LINE INPUT #1,C$:V=VAL(C$) :IF V>VM THEN VM=V
22 C$(V)=C$:GOTO 20
23 U3$=SPACE$(5-LEN(V$) )+V$:U5$=U3$+U2$:RETURN
24 V$=STR$(V) :U2$=": ":GOSUB 23
25 IF V=0 THEN PRINT@0,Z2$:GOTO 29
26 PRINT@0,C$(V) ;Z3$:IF VM THEN 29 ELSE
   PRINT@40,B$(K1,E1(K1))"+< "+B$(K4,E4(K4))+Z3$
27 IF B$(K1,E1(K1))="" THEN GOSUB 68
28 IF B$(K4,E4(K4))="" THEN GOSUB 71
29 V=V+1:U2$=":":V$=STR$(V):IF V>210 THEN CA$="X":GOTO 32
   ELSE GOSUB 23
30 DN$=U5$+DA$:L2=LEN(DN$)+1:PRINT@80,Z3$:PRINT@120,DN$+",";Z3$
31 CA$="":PRINT@(120+L2) ,"";:LINE INPUT"";CA$:IF CA$="" THEN 31
32 IF CA$="X"THEN V=V-1:IF V=VM AND K=0 THEN 40 ELSE GOTO 36
33 IF VAL(CA$)<=0 OR VAL(CA$)=>10^7 THEN
   PRINT@(120+L2) ,"";Z3$:GOTO 31
34 IF INSTR(CA$,":")=0 THEN 87
35 RF=VAL(CA$):IF RF=0 OR RF>=V THEN 30 ELSE VM=V-1:GOTO 83
```

-continued

```
36 PRINT@120,Z9$+Z3$:OPEN H$ FOR OUTPUT AS 1
37 FOR N=1 TO V:IF C$(N)="" THEN 38 ELSE PRINT #1,C$(N)
38 NEXT N:CLOSE:F1=1
39 IF FL=0 THEN 40 ELSE GOTO 75
40 CLS:IF F1=1 THEN PRINT@40,"File "+CE$+DX$+"
   completed.":JQ$=""
41 IF FL=1 THEN PRINT@80,"Account List ALN"+RK$+".DO"+"
   completed."
42 PRINT@120,"Program ENTER CODE finished.":JQ$=""
43 PRINT@240,Y2$;Z3$
44 PRINT@(240+LEN(Y2$)+1),"";:JQ$=INKEY$:IF JQ$="" THEN 44
45 JQ=INSTR("CcMm",JQ$):IF JQ=0 THEN 43
46 CLS:ON JQ GOTO 6,6,47,47
47 MENU
48 H$=CE$+SC$:CLS:PRINT:PRINT Z4$+H$:PRINT:PRINT:PRINT"
   W a i t ..."
49 OPEN H$ FOR INPUT AS 1:SM(G)=0
50 IF EOF(1) THEN CLOSE 1:GOTO 18
51 INPUT #1,A$,B$,DU$
52 G=VAL(LEFT$(A$,1)):IF G<1 OR G>4 THEN 65
53 E(G)=VAL(MID$(A$,2,2))
54 A$(G,E(G))=A$:B$(G,E(G))=B$+","1+DU$
55 IF SM(G)<E(G) THEN SM(G)=E(G)
56 IF E(G)>F THEN 65 ELSE GOTO 50
57 'Subr.Errors
58 CLS:BEEP:PRINT "ERROR-";ERR;"in line ";ERL:END
59 CLOSE:IF ERR=54 OR ERR=51 THEN 65
60 IF ERR<>52 THEN 58
61 IF H$="0:"+DX$ THEN CLS:N=0:RESUME 24
62 IF H$="0:"+SC$ THEN CLS:PRINT@120,"New account list
   "+H$+""ELSE RESUME 40
63 OPEN H$ FOR OUTPUT AS 1
64 FOR M3=1 TO 4:PRINT#1,A$(M3,0):NEXT M3:CLOSE 1:RESUME 49
65 BEEP:PRINT "ERROR! Bad format of file ";H$:CLOSE
66 PRINT: PRINT""Program TRANSJ.BA interrupted.":RESUME 43
67 'New accounts
68 B$(K1,E1(K1))=RIGHT$(DN$,8)+",
   ?":PRINT@40,B$(K1,E1(K1))+"<"+B$(K4,E4(K4))+Z3$
69 IF E1(K1)>SM(K1) THEN SM(K1)=E1(K1)
70 A$(K1,E1(K1))=K2$:FL=1:RETURN
71 B$(K4,E4(K4))=RIGHT$(DN$,8)+",
   ?":PRINT@40,B$(K1,E1(K1))+"<"+B$(K4,E4(K4))+Z3
72 IF E4(K4)>SM(K4) THEN SM(K4)=E4(K4)
73 A$(K4,E4(K4))=K5$:FL=1:RETURN
74 'Account List
75 H$=CE$+SC$:OPEN H$ FOR OUTPUT AS 1
76 CLS:PRINT:PRINT Z5$+H$:PRINT:PRINT:PRINT"      W a i t ..."
77 FOR G=1 TO 4
78 FOR N1=0 TO SM(G)
79 IF A$(G,N1)="" THEN 81
80 PRINT #1,A$(G,N1)+","+B$(G,N1)
81 NEXT N1
82 NEXT G:CLOSE:GOTO 40
83 DN$=SPACE$(6-LEN(CA$) )+CA$+DA$:IF C$(RF)="" THEN
   PRINT@0,DN$+Z3$ ELSE PRINT@0,C$ (RF)+Z3$
84 PRINT@40,Z3$:PRINT@120,Z1$+DN$+Z7$+","+Z3$:L2=LEN(DN$)+1
85 K=1:CA$="":PRINT@(120+L2) ,"";:LINE INPUT"";CA$:IF
   CA$="" THEN 93
86 IF VAL(CA$)<=0 OR VAL(CA$)=>10^7 THEN
   PRINT@(120+L2),"";Z3$:K=0:GOTO 31
87 M4=ASC(RIGHT$(CA$,1)):IF M4<65 OR M4>90 THEN
   PRINT@(120+L2),"";Z3$:GOTO 31
88 L3=L2+LEN(CA$):PRINT@(120+L3),",";
89 K3$="":LINE INPUT K3$:IF VAL(K3$)<100 OR VAL(K3$)>500
   THEN 30
90 IF VAL(K3$)=500 THEN K1=5:K2$="500C":Z$(K1)="INITIAL
   CAP,!CAPITAL":PRINT@ L4, "<";:GOTO 97
91 K1$=LEFT$(K3$,1):K1=VAL(K1$):E1(K1)=VAL(RIGHT$(K3$,2))
92 L4=(120+L3+LEN(K3$)+1):PRINT@ L4,"<";:GOTO 96
93 IF RF>0 THEN PRINT@120+12," ERASE - Y/N";:INPUT JQ$
   ELSE GOTO 96
94 IF JQ$="Y"OR JQ$="y"THEN C$(RF)="":K=1 ELSE K=0
95 PRINT@(120+L2),"";Z3$:IF C$(VM)="" THEN
   RF=RF-1:VM=RF:V=VM:GOTO 95 ELSE RF=0:V=VM:GOTO 24
96 J1=INSTR("1234",K1$):KD$=MID$("IEAL",J1,1)
97 K6$="":LINE INPUT K6$:IF VAL(K6$)<100 OR VAL(K6$)>500
   THEN 30
98 IF VAL(K6$)=500 THEN K4=5:K5$="C500":Z$(K4)="INITIAL
   CAP,!CAPITAL":GOTO 102
```

-continued

```
 99 K4$=LEFT$(K6$,1) :K4=VAL(K4$) :E4(K4)=VAL(RIGHT$(K6$,2))
100 J2=INSTR("1234",K4$):KC$=MID$("IEAL",J2,1):IF J1<3 AND
    J2<3 THEN K2$=K3$+"i":K5$="i"+K6$:GOTO 102
101 IF J1=1 OR J2=2 THEN K2$=K3$+"s":K5$="s"+K6$
102 U$=": ":GOSUB 23:C$(V)=DN$+","+CA$+","+K2$+"<"+K5$
103 K2$=K3$+KD$:K5$=K6$+KC$ :GOTO 24
```

Appendix II

```
 1 'UPDTAL.BA - UPDATE ACCOUNT LIST
 2 MAXFILES=2 :CLEAR 4000:DEFINT E-V:F=55:SCREEN 0,0
 3 DIM A$(4,F),B$(4,F):FN=0:F1=0:E=0:CE$="0:":ON ERROR GOTO 81
 4 Z1$="T)itles B)udg.names
   N)umbers":Z0$=CHR$(27)+CHR$(112) :Z7$=CHR$(27)+CHR$(113)
 5 Z2$=" UPDATE ACCOUNT LIST     ALN":Z2=LEN(Z2$)
 6 Z3$=CHR$(27)+CHR$(75) :W9$="S)ort? M)enu? D)amenu"
 7 CLS:PRINT Z2$
 8 PRINT@Z2,Z3$:PRINT@Z2,"";:LINE INPUT"(yr=?) ";RK$:IF
   VAL(RK$)=0 OR LEN(RK$)<>2 THEN 8
 9 SC$="ALN"+RK$+".DO":SR$="ALB"+RK$+".DO"
   SJ$="ALT"+RK$+".DO":H$=CE$+SC$
10 Z5$="       Sorting ";Z4$="       Checkup "
11 D$(1)="1OOP,VARINCOME, !INCONE":
   D$(2)="2OON,VAREXPENS, !EXPENSES"
12 D$(3)="300M,VARASSETS, !ASSETS":
   D$(4)="400Z,VARLIABIL, !LIABILIT"
13 GOTO 66
14 JQ$=INKEY$:IF JQ$=""THEN 14
15 IF JQ$="X"OR JQ$="X"THEN 22 ELSE RETURN
16 CLS:PRINT@80,"Sort ":PRINT@120,Z1$+Z3$:GOSUB
   14:J1=INSTR("TBNtbn",JQ$):IF J1=0 THEN 16
17 Z6$="Sorting":IF J1>3 THEN J1=J1-3
18 PRINT@80,Z6$+Z3$:PRINT@120,Z3$:ON J1 GOTO 19, 20, 21
19 F1=1:H1$=SJ$:GOTO 67
20 F1=2:H1$=SR$:GOTO 67
21 F1=3:H1$=SC$:GOTO 67
22 CLS:IF FN>0 THEN PRINT:PRINT Z4$+SC$:PRINT:PRINT"
   W a i t ... ":OPEN H$ FOR OUTPUT AS 1 ELSE GOTO 59
23 FOR G=1 TO 4
24 FOR N=0 TO SM(G)
25 IF A$(G,N)=""THEN 27
26 PRINT #1,A$(G,N):B$(G,N)=""
27 NEXT N
28 NEXT G:CLOSE 1:CLS:GOTO 59
29 REM New account list
30 OPEN H$ FOR OUTPUT AS 1
31 PRINT #1,D$(1):PRINT #1,D$(2):PRINT#1,D$(3):PRINT
   #1,D$(4):CLOSE 1:FN=1:GOTO 59
32 'Sorting
33 OPEN H1$ FOR OUTPUT AS 1:IF E(G)=0 THEN E(G)=1
34 DIM ST(INT(LOG(E(G))/LOG(2))+1,2)
35 FOR G=1 TO 4
36 SP=1:ST(SP,1)=1:ST(SP,2)=E(G)
37 IF SP<=0 THEN 52
38 P=ST(SP,1) :R=ST(SP,2)SP=SP-1
39 IF P=>R THEN 51
40 I=P:J=R:S=1
41 IF I=>J THEN 45
42 IF A$(G,I)>A$(G,J) THEN
   T$=A$(G,I) :T1$=B$(G,I):A$(G,I)=A$(G,J) :B$(G,I)=B$(G,J):
   A$(G,J)=T$:B$(G,J)=T1$:S=-S
43 IF S=1 THEN I=I+1 ELSE J=J-1
44 GOTO 41
45 IF R-I>J-P THEN 48
46 IF J-1>P THEN SP=SP+1:ST(SP,1)=P:ST(SP,2)=J-1
47 P=I+1:GOTO 50
48 IF I+1<R THEN SP=SP+1:ST(SP,1)=I+1:ST(SP,2)=R
49 R=J-1
50 GOTO 39
51 GOTO 37
52 FOR I=0 TO SM(G)
53 IF A$(G,I)=""THEN 56
54 IF B$(G,I)=""THEN PRINT #1,A$(G,I):GOTO 56
55 PRINT #1,A$(G,I)+","+B$(G,I)
56 NEXT I
57 NEXT G
58 CLOSE:CLS:IF F1>0 THEN PRINT@40,"File "+H1$" has been sorted."
59 IF FN>0 THEN PRINT@80,"Account List "+H$+" updated."+Z3$:FN=0
60 PRINT@120, "Program "+CE$+"UPDTAL.BA ended. "+Z3$
```

-continued

```
61 PRINT@200,W9+Z3$:GOSUB 14:J4=INSTR("SMDsmd",JQ$):IF
    J4=0 THEN 61
62 IF J4>3 THEN J4=J4–3
63 ON J4 GOTO 16,64,65
64 MENU
65 RUN"DAMENU.BA"
66 CLS:PRINT:PRINT Z4$+H$
67 PRINT"      W a i t ... "
68 OPEN H$ FOR INPUT AS 1:SM(G)=0
69 IF EOF(1) THEN CLOSE 1:IF F1>0 THEN 32 ELSE CLS:GOTO 87
70 INPUT #1,AU$,BU$,DU$
71 G=VAL(LEFT$(AU$,1)):IF G<1 OR G>4 THEN 85
72 E(G)=VAL(MID$(AU$2,2))
73 IF F1=0 OR F1=3 THEN 76
74 IF F1=2 THEN A$(G,E(G))=DU$+","+BU$+","+AU$:GOTO 77
75 IF F1=1 THEN A$(G,E(G))=BU$+","+DU$+","+AU$:GOTO 77
76 A$(G,E(G))=AV$","+BU$+","+DU$
77 IF E(G)>SM(G) THEN SM(G)=E(G)
78 IF E(G)>F THEN 85 ELSE GOTO 69
79 'Errors
80 CLS:BEEP:PRINT"ERROR-";ERR;" in line "ERL:STOP:END
81 IF ERR=54 OR ERR=51 THEN 85
82 IF ERR=18 THEN CLS:PRINT@53," Disk error.":END
83 IF ERR<>52 THEN 80
84 CLS:PRINT@5,"New "+H$+".":RESUME 29 ELSE GOTO 86
85 BEEP:PRINT"ERROR! Bad format in file ""+H$
86 PRINT: PRINT"Program UPDTAL.BA interrupted."
87 PRINT@0,Z3$
88 PRINT@0, "Account Number"; :INPUT Z8$
89 IF Z8$="X"OR Z8$="x"THEN 22
90 IF LEN(Z8$)>3 THEN Z9$=RIGHT$(Z8$,3) ELSE
    N3=55:G3=4:GOTO 93
91 Z9=VAL(Z9$):IF Z9<100 OR Z9>500 THEN N3=55:G3=4GOTO 93
92 G3$=LEFT$(Z9$,1) :N3$=RIGHT$(Z9$,2):
    G3=VAL(G3$) :N3=VAL(N3$) :Z8$=LEFT$(Z8$,3)
93 Z8=VAL(Z8$):IF Z8<100 OR Z8>500 THEN Z8$="":CLS:GOTO 87
94 G$=LEFT$(Z8$,1) :N$=RIGHT$(Z8$,2) :G4=VAL(G$):N=VAL(N$) :A=0
95 G1=G4:N1=N:G2=G4:N2=N
96 IF A$(G1,N1)=""THEN 99 ELSE L6=LEN(A$(G1,N1))
97 PRINT@A,A$(G,N1)+STRING$(38-L6," ");
98 A=A+40:IF A>280 THEN A=0:N=N1:G4=G1:GOTO 101
99 N1=N1+1:IF N1>N3 THEN G1=G1+1:N1=0
100 IF G1>G3 OR N1>N3 THEN W8=1:A=0:N=N1:G4=G1:GOTO 101
    ELSE W8=0:GOTO 96
101 PRINT@34,STRING$(3,".");:"PRINT@34,"";:LINE INPUT JQ$
102 IF JQ$=""AND W8=1 THEN Z8$="":CLS:GOTO 87 ELSE IF
    JQ$=""THEN CLS:GOTO 95
103 IF INSTR(JQ$,",")>0 OR LEN(JQ$)>3 OR JQ$=" "THEN 101
104 IF JQ$="X"OR JQ$="X"THEN Z8$="":CLS:GOTO 87
105 JQ=VAL(JQ$):IF JQ<100 or JQ>500 OR
    RIGHT$(JQ$,2)="00"THEN 101 ELSE
    JQ=VAL(RIGHT$(JQ$,2)) :G1=VAL(LEFT$(JQ$,1))
106 IF A$(G1,JQ)=""THEN G9$=" (New account) "ELSE
    G9$="":GOTO 108
107 A$(G1,JQ)=JQ$+MID$("IEAL",VAL(LEFT$(JQ$,1)),1)
108 CLS:PRINT@160,Z0$+A$(G1,JQ)+G9$+Z7$+Z3$
109 PRINT@240,LEFT$(A$(G1,JQ),4)+","+STRING$(10,"."+STRING$(10,".");:
    PRINT@245,"";
110 LINE INPUT B$(G1,JQ) :L2=LEN(B$(G1,JQ))
111 IF L2=0 THEN PRINT@245,"       ERASE - Y/N";:INPUT JI$
    ELSE GOTO 113
112 IF JI$="Y"0R JI$="y" THEN A$(G1,JQ)="":FN=1:G1=G2:N1=N2:CLS:GOTO 96
    ELSE CLS:G1=G2:N1=N2:GOTO 96
113 IF INSTR(B$(G1,JQ),",")>0 OR L2>10 OR B$(G1,JQ)=""THEN 109
114 L3=5+LEN(B$(G1,JQ)+",") :FN=1:IF JQ>SM(G1) THEN SM(G1)=JQ
115 IF JQ>N3 AND N3<56 THEN N3=JQ
116 PRINT@240,LEFT$(A$(G1,JQ),4)+","B$(G1,JQ)+","+STRING$(10,".")+Z3$:
    PRINT@240+L3,"";
117 LINE INPUT"";DU$:IF DU$=""THEN PRINT@240+L3,Z3$:GOTO 119
118 IF INSTR(DU$,",")>0 OR LEN(DU$)>10 OR DU$=" "THEN 116
119 A$(G1,JQ)=LEFT$(A$(G1,JQ),4)+","+B$(G1,JQ)+","+DU$:FN=1:
    G1=G2:N1=N2:CLS:GOTO 96
```

Appendix III

```
1 'EXTR-T.BA – EXTRACT T-ACCOUNTS
2 MAXFILES=2 :CLS:CLEAR 4000:DEFSNG C:DEFINT
  F,H–P:H=0:L=0:K=1:P=0:CE$="0:":Y0$="":OP=0:F=55:D$=""DiMA$(4,F)
3 Z3$=CHR$(27)+CHR$(75):SCREEN 0,0:ON ERROR GOTO 73
```

-continued

```
 4 J0$="YEAR         (yr)="
 5 J1$="ACCOUNT NUMBER(S)      (### ###)=":L1=80+LEN(J1$)
 6 J3$="\ \! ########.##\     \\     \"
 7 J4$="\ \!\      \\      \########.##"
 8 J5$="\ \########.##\    \########.##"
 9 J8$="EXTRACT T-ACCOUNT(S)"
10 J9$="CURRENCY (D=USD,M=DM,S/F/K,...)="
11 Y8$="E)XTR-T ?   M)enu ?   D)amenu"
12 PRINT@(20-LEN(J8$)/2),CHR$(27)+CR$(112)
   +J8$+CHR$(27)+CHR$ (113)
13 PRINT@40,J0$+Z3$
14 PRINT@80,J1$+Z3$
15 PRINT@160,J9$+Z3$
16 PRINT@(39+LEN(J0$)),"";"INPUT Y2$:IF LEN(Y2$)<>2 THEN 13
17 MM$="01":M1$="12":Y1$=Y2$+MM$
18 PRINT@(L1+L,"";LINE INPUT"";CU$:IF CU$=""THEN
   K=K-1:GOTO 21 ELSE D$=","
19 PRINT@L1+L+LEN(CU$),D$:IF LEN(CU$)>3 OR VAL(CU$)<100 OR
   VAL(CU$)>599 THEN PRINT@(L1+L),Z3$:GOTO 18
20 CU$(K)=CU$:CU(K)=VAL(CU$(K)) :CZ$=CZ$+CU$+",":K=K+1:IF
   K>10 THEN K=K-1:GOTO 25 ELSE L=L+LEN(CU$(K-1))+1:GOTO 18
21 IF K=0 THEN K=1:GOTO 18
22 PRINT@(160+LEN(J9$)),Z3$:PRINT@(160+LEN(J9$))#"";
23 INPUT Y5$:IF Y5$=""OR LEN(Y5$)>1 OR VAL(Y5$)>0 OR
   ASC(Y5$)>90 THEN 22
24 IF OP=0 THEN 75
25 FOR I=1 TO K
26 KG=VAL(LEFT$(CU$(I),1)) :KH=VAL(RIGHT$(CU$(I),2)):
   CU$(I)=LEFT$(A$(KG,KH),3): IF CU$(I)>""THEN
   CR$=CR$+Y5$+CU$(I)+".DO"+","ELSE GOTO 54
27 DW$=Y5$+CU$(I)+".DO":OPEN DW$ FOR OUTPUT AS 2:GOSUB 70
28 DX$="DB"+Y1$:H$=CE$+DX$:P=1
29 OPEN H$ FOR INPUT AS 1:PRINT@260,Z3$:PRINT@260,CU$(I);"-";DX$:GOSUB 69
30 IF EOF(1) THEN CLOSE 1:GOTO 64:'Nova HK
31 INPUT #1,YR$(I),CA$(I),KA$(I):YR$=YR$(I):CA$=CA$(I):KA$=KA$(I)
32 CA=VAL(CA$):IF CA=0 THEN 72
33 MN$=RIGHT$(CA$,1):IF ASC(MN$)<65 THEN MN$="K"
34 IF MN$<>Y5$ THEN 30
35 C7$=LEFT$(KA$,4) :C8$=RIGHT$(KA$,4) :J3=INSTR(YR$,":"):
   RF$=LEFT$(YR$,J3) :YR$=MID$(YR$,J3+1,4) :RF=4-LEN(RF$): IF
   RF>0 THEN RF$=STRING$(RF," ")+RF$
36 IF H<>0 AND C7$="500K"THEN 30
37 IF H<>0 AND C8$="K500" THEN 30
38 CD$=LEFT$(C7$,3) :CD=VAL(CD$) :CC$=RIGHT$(C8$,3) :CC=VAL(CC$)
39 IF CD=CU(I) THEN KA$=" *"+KA$+" ":TD(I)=TD(I)+CA:GOTO 43
40 IF CC=CU(I) THEN KA$=" "+KA$+"*":TC(I)=TC(I)+CA:GOTO 45
41 GOTO 30
42 PRINT#2, YR$ : P=0 : RETURN
43 IF P>0 THEN GOSUB 42
44 PRINT #2, USING J3$;RF$;"";CA;KA$;"":GOTO 40
45 IF P>0 THEN GOSUB 42
46 PRINT #2,USING J4$;RF$;"";"";KA$;CA:GOTO 30
47 PRINT #2,STRING$(39,"-") :'Exit
48 IF KG>2 THEN GOSUB 84:'PrKp
49 PRINT #2,USING J5$;"";TD(I);" Turnover     ";TC(I)
50 DI=(TC(I)+S4)-(TD(I)+S1):IF TD(I)+S1=>TC(I)+S4 THEN
   PRINT#2,USING J4$;"";"";"";" Balance     ";ABS(DI) ELSE
   PRINT#2,USING J3$;"";"";DI;" Balance      ";""
51 PRINT #2,STRING$(39,"-":IF TD(I)+S1=>TC(I)+S4 THEN
   PRINT #2,USING J5$;"";TD(I)+S1;"";TC(I)+S4+ABS(DI) ELSE
   PRINT#2,USING J5$;"";TD(I)+S1+ABS(DI);"";TC(I)+S4
52 PRINT #2,STRING$(39,"=")
53 CLOSE:MM$="01":Y1$=Y2$+MM$
54 NEXT I
55 CLS:PRINT:IF CR$>""THEN PRINT"File(s) ";CR$;"
   created. "ELSE PRINT"Aacount(s) ";CZ$;" absent."
56 PRINT "Program EXTR-T.BA ended.
57 PRINT@160,Y8$+Z3$
58 PRINT@(160+LEN(Y8$)+1) ,"";:INPUT JQ$:JQ$=LEFT$(JQ$,1)
59 JQ=INSTR("EMDemd",JQ$):IF JQ=0 THEN 57
60 IF JQ>3 THEN JQ=JQ-3
61 ON GQ GOTO 2,62,63
62 MENU
63 RUN"DAMENU.ba"
64 IF MM$=M1$ THEN 47:'next db
65 YY=VAL(Y2$) :MM=VAL(MM$)+1:H=1
66 IF MM<=9 THEN M2$="0"RIGHT$(STR$(MM),1) ELSE
   M2$=RIGHT$ (STR$(MM),2)
67 YN$=Y2$+M2$
```

-continued

```
68 Y1$=YN$:Y2$=LEFT$(Y1$,2) :MM$=RIGHT$(Y1$,2) :GOTO 28
69 PRINT@250,"Wait ...":RETURN
70 PRINT #2,TAB(19-LEN(A$(KG,KH))/2) ;Y5$+"
   "+A$(KG,KH) :'heading
71 PRINT #2,STRING$(39,"=") :RETURN
72 CLS:BEEP:PRINT "ERROR-";ERR;" in line ";ERL:RESUME 57
73 IF ERR=54 THEN CLS:BEEP:PRINT"ERROR! Bad format in file
   "+H$+" ("+YR$+", "+CA$+", "+KA$+")";RESUME 57
74 IF ERR=52 THEN CLS:PRINT@40,"File "+H$+"
   absent.":RESUME 57 ELSE GOTO 72
75 'ALN
76 SC$="ALN"+Y2$+".DO":H$=CE$+SC$:OPEN H$ FOR INPUT AS
   1:PM(M)=0:GOSUB 69
77 IF EOF(1) THEN CLOSE 1:GOTO 25
78 INPUT #1,AU$,BU$,DU$
79 M=VAL(LEFT$(AU$,1)) :L(M)=VAL(MID$(AU$,2,2))
80 A$(M,L(M))=AU$+","+BU$+","+DU$
81 IF PM(M)<L(M) THEN PM(M)=L(M)
82 IF L(M)>F THEN 73 ELSE GOTO 77
83 'Transfer
84 OY=VAL(Y2$)-1:OY$=RIGHT$(STR$(OY),2):Y1$=OY$+"12":
   HN$="B"Y5$+Y1$+".DO":H$=CE$+HN$: OPEN H$ FOR INPUT AS
   1:PRINT@260,CU$(I) ;"-";HN$
85 IF EOF(1) THEN CLOSE 1:RETURN:'470
86 LINE INPUT #1, H7$:H7=VAL(LEFT$(H7$,3))
87 IF H7<>CU(I) THEN 85
88 SK$=RIGHT$(H7$,12) :SK=VAL(LEFT$(SK$,11))
89 IF H7<400 THEN S1=SK:PRINT#2,USING J3$;"";"";S1;"
   Transfer   ";""ELSE S4=SK:PRINT#2,USING J4$;"";"";"";"
   Transfer   ";S4
90 GOTO 85
```

Appendix IV

```
1 REN CLOSEL.BA - CLOSE LEDGER
2 MAXFILES=3:CLER 4000:SCREEN 0,0:DEFSTR A-E,G,H,Z:DEFINT
  F,I-P:DEFDBL Q-T
3 F=55:DIM
  Q(4,F),Q1(4,F),Q3(F),Q4(F),A(4,F),B(4,F),A4(20):JZ=0:CLS:ON-ERROR
  GOTO 132
4 CE="0:":Z3=CHR$(27)+CHR$(75)
5 C3="CLOSE LEDGER": D5="Closing Balance"
6 PRINT@(20-LEN(C3)/2),CHR$(27)CHR$(112)+C3+CHR$(27)+CHR$(113)
7 C2="T)RIAL BALANCE/C)LOSING BAL."
8 C5="\        \########.##"
9 C6="\       \\     \"
10 C8="D)AMENU? M)ENU":DO="Checkup ":D1="Account List."
11 D9=STRING$(11,"-") :D2="Database":D3="Wait ..."
12 C0="ACCOUNTING PERIOD      (yymm)= "
13 PRINT@80,C0+Z3
14 C1="CURRENCY (D=USD,N=DM, S,F,...) ="
15 PRINT@120,C1+Z3
16 PRINT@160, C2+Z3
17 PRINT@80+LEN(CO),"";:INPUT B9:IF LEN(B9)>4 OR B9=""THEN 13
18 B2=LEFT$(B9,2):H2=MID$(B9,3,2):IF VAL(H2)=0 THEN 13
19 BN="":PRINT@120+LEN(C1),Z3:PRINT @120+LEN(C1),"";:INPUT
   BN:BN=LEFT$(BN,1) :IF BN=""THEN 19
20 IF BN="K"THEN BN(0)="Kc"
21 IF BN="D"THEN BN(0)="USD"
22 IF BN="M"THEN BN(0)="DM"
23 PRINT@160+LEN(C2) ,"";:INPUT BB:IF BB="C"OR BB="c"THEN
   BB="C"ELSE BB=""
24 IF BB="C"THEN D4="Closing balance"ELSE D4="Trial balance"
25 H3="01":B1=B2+H3:HS=CE+"ALN"+B2+".DO":GOSUB 107
26 H=HN:OPEN H FOR INPUT AS 1:GOSUB 112
27 IF EOF(1) THEN CLOSE 1:GOTO 34
28 LINE INPUT #1,H7:IF VAL(LEFT$(H7,1))=0 THEN 27
29 RA=VAL(RIGHT$(H7,11)) :RA=ABS(RA) :HA=LEFT$(H7,3):
   H8=LEFT$ (HA,1) :H9=RIGHT$ (HA,2)
30 IF H8="3" THEN HD=HA:K1=VAL(H8):L1(K1)=VAL(H9):
   HC="500":K4=5:L4(K4)=0 ELSE GOTO 32
31 JZ=JZ+1:RP(0)=RP(0)-RA:QC(0)=QC(0)-RA:T=T-RA:
   Q3(L1(K1))=Q3(L1(K1))+RA:Q(K1,L1(K1))=Q(K1,L1(K1))+RA:
   S3=S3+RA:S=S+RA:GOSUB 44
32 IF H8="4" THEN HD="500":K1=5:L1(K1)=0:HC=HA:K4=VAL(H8):
   L4(K4)=VAL(H9) ELSE GOTO 27
33 JZ=JZ+1:RP(0)=RP(0)+RA:QD(0)=QD(0)+RA:S=S+RA:
   Q4(L4(K4))=Q4(L4(K4))-RA:T4=T4-RA:
   Q1(K4,L4(K4))=Q1(K4,L4(K4))-RA:T=T-RA:GOSUB 45:GOTO 27
34 DX=CE+"DB"+B1+".DO":H=DX:OPEN H FOR INPUT AS 1:GOSUB 112
```

-continued

```
35 IF EOF(1) THEN CLOSE 1:GOTO 46
36 INPUT #1,BR,CA,HA:RA=VAL(CA):IF RA=0 THEN 136
37 BJ=RIGHT$(CA,1):MJ=ASC(BJ):IF BN="K"AND MJ<65 THEN 39
38 IF BJ<>BN THEN 35
39 HD=LEFT$(HA,3) :HC=RIGHT$(HA,3) :K1=VAL(LEFT$(HD,1)):
   L1(K1)=VAL(RIGHT$(HD,2)) :K4=VAL(LEFT$(HC,1)):
   L4(K4)=VAL(RIGHT$(HC,2))
40 IF K1=5 THEN JZ=JZ+1:RP(0)=RP(0)+RA:QD(0)=QD(0)+RA:S=S+RA:GOTO 43
41 Q(K1,L1(K1))=Q(K1,L1(K1))+RA:S=S+RA:GOSUB 44
42 IF K4=5 THEN JZ=JZ+1:RP(0)=RP(0)-RA:
   QC(0)=QC(0)-RA:T=T-RA:GOTO 35
43 Q1(K4,L4(K4))=Q1(K4,L4(K4))-RA:T=T-RA:GOSUB 45:GOTO 35
44 IF L1(K1)>PM(K1) THEN PM(K1)=L1(K1):RETURN ELSE RETURN
45 IF L4(K4)>PM(K4) THEN PM(K4)=L4(K4):RETURN ELSE RETURN
46 GOSUB 103:IF BO<=B9 THEN B1=BO:GOTO 34 ELSE
   HM="DB"+B0+".DO":DO="":GOTO 123
47 B3="Z"+BN+B1:BZ=BZ+B3+",":OPEN B3 FOR OUTPUT AS 2
48 IF BB="C"THEN B4="B"+BN+B1 ELSE B4="T"+BN+B1
49 BZ=BZ+B4+",":OPEN B4 FOR OUTPUT AS 3:BZ=BZ+RIGHT$(HM,9)
50 H-D4:GOSUB 112:GOSUB 114:'entries
51 K=2:C9(1)="TOTAL INCOME":C9(2)="TOTAL EXPENSES":J=0
52 IF J=2 THEN 62 ELSE J=J+1
53 FOR P=0 TO PM(J)
54 IF P=0 THEN 56
55 IF A(J,P)="" THEN 83
56 RI=Q(J,P)+Q1(J,P) :TL(J)=TL(J)+R1
57 AW=LEFT$(A(J,P),3)+"?":AV=RIGHT$(A(J,P),LEN(A(J,P)-4):
   IF J=1 AND RI>0 THEN A(J,P)=AW+AV
58 IF J=2 AND RI<0 THEN A(J,P)=AW+AV
59 PRINT #K,USING C5;A(J,P);RI
60 NEXT P:GOSUB 79
61 GOTO 52
62 RP(9)=TL(1)+TL(2):IF RP(9)<=0 THEN
   B6(9)="PROFIT":QC(9)=RP(9) ELSE B6(9)="LOSS":QD(9)=RP(9)
63 B6(0)="500K,!CAPITAL, INIT.CAP":B6(1)="FINAL
   CAPITAL":RP(1)=RP(0)+RP(9)
64 QD(1)=QD(0)+QD(9):QC(1)=QC(0)+QC(9)
65 J=5:TL(5)=RP(9):C9(5)=B6(9):GOSUB 80
66 K=3:C9(3)="TOTAL ASSETS":C9(4)=∂TOTAL LIABILIT":J=2
67 IF J=4 THEN 77 ELSE J=J+1
68 FOR P=0 TO PM(J)
69 IF P=0 THEN 71
70 IF A(J,P)="" THEN 83
71 RI=Q(J,P)+Q1(J,P) :TL(J)=TL(J)+R1
72 AW=LEFT$(A(J,P),3)+"?":AV-RIGHT$(A(J,P),LEN(A(J,P))-4):
   IF J=3 and RI<0 THEN A(J,P)=AW+AV
73 IF J=4 and RI>0 THEN A(J,P)=AW+AV
74 PRINT #K,USING C5;A(J,P);RI
75 NEXT P:GOSUB 79
76 GOTO 67
77 IF (S+T)<>0 THEN 139:'TEST
78 DO=D5:H="":GOSUB 112:GOTO 85
79 PRINT #K, USING C6;"";D9
80 PRINT #K, USING C5;C9(J);TL(J)
81 PRINT #K,STRING$(39,"-")
82 RETURN
83 IF Q(J,P)>0 OR Q1(J,P)>0 THEN Z4=MID$("IEAL",J,1):
   A(J,P)=RIGHT$(STR$(J*100+P),3)+Z4+","+"?": IF <3 THEN 56 ELSE GOTO 71
84 IF J<3 THEN 60 ELSE GOTO 75
85 B6(9)="509C,    "+B6(9)
86 B6(2)="FINAL CAPITAL + LIBILIT":RP(2)=RP(1)+TL(4)
87 A3=B6(0):RN=RP(0):GOSUB 102
88 A3=B6(9):RN=RP(9):GOSUB 102
89 PRINT #K,STRING$(39,"-")
90 A3=B6(1):RN=RP(1):GOSUB 102
91 PRINT #K,STRING$(39,"=")
92 A3=B6(2):RN=RP(2):GOSUB 102
93 PRINT #K,STRING$(39,"-")
94 OPEN HM FOR OUTPUT AS 1:CLOSE
95 CLS:PRINT@40,"File(s) "+BZ+" created."
96 BEEP:BEEP:PRINT@160,"PROGRAM CLOSE LEDGER "+B9+" ENDED.":DQ=""
97 PRINT@240,C8;" ":PRINT@240+LEN(C8)+1,"";:INPUT DQ:IF LEN(DQ)>1
   THEN 97
98 JQ=INSTR("DdMm",DQ):IF JQ=0 THEN 97
99 ON JQ GOTO 100,100,101,101
100 RUN"DAMENU.BA"
101 MENU
102 PRINT #K, USING C5;A3;RN:RETURN
103 OY=VAL(B2) :MM=VAL(H3)+1:H3=RIGHT$(STR$(MM),2)
```

-continued

```
104  IF MM>12 THEN B0=STR$(OY+1):B0=RIGHT$(B0,2):H3="01"
     ELSE B0=B2
105  IF MM<=9 THEN H3="0"+RIGHT$(STR$(MM),1)
106  B0=B0+H3:RETURN
107  OY=VAL(B2) :MM=VAL(H3)-1
108  IF MM=0 THEN B0=STR$(OY-1)+"12":B0=RIGHT$(B0,4):GOTO 111
109  IF MM<=9 THEN H1="0"+RIGHT$(STR$(MM),1) ELSE
     H1=RIGHT$ (STR$(MM),2)
110  B0=B2+H1
111  HN=CE+"B"+BN+B0+".DO":RETURN
112  CLS:PRINT@173, D0+H
113  PRINT@213,D3:RETURN
114  J3=INSTR(BR,":") :DD=LEFT$(BR,J3)
115  I=2:H4="INCOME+EXPENSES as of "+B9+" ("+DD+")"
116  PRINT #I,TAB((39-LEN(H4))/2);BN(0)+" "+H4:IF I=3 THEN
     PRINT #I,TAB((39-LEN(E2))/2);BN(0)+" ++E2 ELSE PRINT #I,""
117  PRINT #I,STRING$(39,"-")
118  PRINT #I,USING C6;"ACC#"+""+""+""+"";"    "+"Balance
119  PRINT #I,STRING$(39,"=")
120  IF I=3 THEN RETURN
121  I=3:IF BB="K"THEN H4="CLOSING BALANCE as of "+B9+"
     ("+DD+")"ELSE H4="TRIAL BALANCE as of "+B9+" ("+DD+")"
122  GOTO 116
123  H=HS: OPEN H FOR INPUT AS 1:PM(M)=0:GOSUB 112
124  IF EOF(1) THEN CLOSE 1:GOTO 47
125  INPUT #1,AU,BU,DU
126  M-VAL(LEFT$(AU,1)):L(M)=VAL(MID$(AU,2,2))
127  IF L(M)=0 THEN 129
128  IF Q(M,L(M))<>0 OR Q1(M,L(M))<>0 THEN 129 ELSE GOTO 124
129  A(M,L(M) )=AU+","+BU+","+DU
130  IF PM(M)<L(M) THEN PM(M)=L(M)
131  IF L(M)>F THEN 142 ELSE GOTO 124
132  IF ERR<>52 THEN 135 ELSE IF H=HD THEN RESUME 25
133  IF H=HN AND H3="01"THEN 143
134  IF H=""THEN 140 ELSE CLS:BEEP:PRINT:PRINT"File ";H;"
     absent. ":CLOSE: PRINT: PRINT"Program CLOSEL.BA
     interrupted. ":Resume 97
135  IF ERR<>54 THEN 140
136  CLS:BEEP:PRINT "ERROR! Bad format of file ";H:IF H=HS
     THEN PRINT" ["+A(M,L(M))+","+B(M,L(M))+"]":GOTO 97
137  IF H=HN THEN PRINT" ["+H7+"]":GOTO 97
138  IF H=DX THEN PRINT" ["+BR+","+CA","+HA+"]":GOTO 97
139  CLOSE:BEEP:PRINT "ERROR! IMBALANCE ";S+T;"in ";BB:STOP:END
140  BEEP:PRINT "ERROR-";ERR;" in line ";ERL:STOP:RESUME 97
141  CLS:BEEP:PRINT:PRINT "No currency "+BN+" in database
     "+DX+".":KILL B3:K1LL B4:GOTO 97
142  BEEP:PRINT "ERROR! Limit of ";F;" accounts in ctg
     ";M*100;" in ";HS;" exceeded.":GOTO 97
143  CLS:BEEP:PRINT:PRINT"File ";H1"
     absent.":Print"Continue - Y/N";: INPUT GQ:
144  IF GQ="Y"OR GQ="y"THEN RESUME 34 ELSE RESUME 96
```

What is claimed as new and desired to be protected by a Letters Patent is set forth in the appended claims:

1. A method of posting financial transactions into a computer-assisted double-entry accounting system including a general purpose computer having a working memory unit and an input/output (I/O) unit for inputting and displaying user-defined data including at least a monetary amount, a debit account and a credit account; and accounting software, including at least a ledger-creating software, for converting the computer to an accounting machine that implements four basic accounting categories of income, expenses, assets and liabilities, and a fifth category of capital representing the difference between the assets and the liabilities, for entering the amount to the left debit side of a T-account to increase in the expenses or in the assets, or to decrease in the liabilities or in the capital, and for entering the sams amount to the right credit side of another T-account to increase in the income or in the liabilities or in the capital, or to decrease in the assets;

comprising the step of preparing a data transcription software for instructing said computer to perform the program steps of a) opening & categorical (ctg) account list file storing four mandatory account titles each including a ctg symbol and a name assigned to one of said basic categories and generating in said memory unit a separate account title including a ctg symbol and a name assigned to said fifth category of capital;

b) inputting said account titles from said account list file into said memory unit;

c) opening a journal file and four T-account files assigned to said basic account titles;

d) inputting and displaying via said I/O unit, and entering into said memory unit, a user-defined number;

e) checking said number and if a zero or negative value is detected, returning to program step d);

f) inputting and displaying via said I/O unit, and entering into said memory unit, a first user-defined alphanumeric character;

g) checking said first alphanumeric character and if it does not match a ctg symbol in said mandatory account titles, returning to program step f);

h) inputting and displaying via said I/O unit, and entering into said memory unit, a user-defined graphic character in alignment with said first alphanumeric character, said graphic character having a tip side and a base side;

i) inputting and displaying via said I/O unit, and entering into said memory unit, a second alphanumeric character in alignment with said graphic character;

j) checking said second alphanumeric character and if it does not match a ctg symbol in said mandatory account titles, returning to program step i);

k) assembling a ctg directional record in the form "the number, the first alphanumeric character, the graphic character, the second alphanumeric character";

l) storing said ctg directional record in said journal file;

m) returning to program step d); and further comprising the steps of loading instructions from said data transcription software into said memory unit; and executing said program steps whereby the computer prompts the user, in program steps d), f), h) and i) to input, display and enter via said input/output unit a number representing the monetary amount from a transaction, a first alphanumeric character representing the ctg symbol of one accounting category occurring in the transaction, said directional graphic character being oriented according to the direction of transfer of said amount relative to said one category, and a second alphanumeric character representing the ctg symbol of the other category participating in the transaction; whereby in the ctg directional record assembled in program step k), the alphanumeric character pointed at by said tip side designates the debit category, and the remaining alphanumeric character opposite said base side designates the credit category.

2. A method as defined in claim 1, and further comprising the step of preparing an improved ledger-creating software for instructing said computer to perform, prior to step m), the program steps of storing said number at the left side of the T-account assigned to the category pointed at by said tip side; and storing said number at the right side of the T-account assigned to the category opposite said base side.

3. A method of posting financial transactions into a computer-assisted double-entry accounting system including a general purpose computer having a working memory unit and an input/output (I/O) unit for inputting and displaying user-defined data including a monetary amount, a debit account and a credit account; and accounting software, including at least a ledger-creating software, for converting the computer to an accounting machine that implements four basic accounting categories of income, expenses, assets and liabilities, and a fifth category of capital representing the difference between the assets and the liabilities, for entering the amount to the left debit side of a T-account to increase in the expenses or in the assets, or to decrease in the liabilities or in the capital, and for entering the same amount to the right credit side of another T-account to increase in the income or in the liabilities or in the capital, or to decrease in the assets;

comprising the step of preparing a data transcription software for instructing said computer to perform the program steps of a) opening an account list file storing at least four account titles assigned to said basic categories and each including an account number and a descriptive account name, said account number having a first code digit correlated to the assigned category and at least one second code digit assigned to said descriptive account name;

b) opening a journal file;

c) inputting into the memory unit account titles from said account list file and generating in the memory unit a separate account title assigned to said fifth category of capital;

d) inputting and displaying via said I/O unit, and entering into said memory unit, a user-defined first number;

e) checking said first number and if a zero or negative value is detected, returning to program step d);

f) inputting and displaying via said I/O unit, and entering into said memory unit, a user-defined second number;

g) checking said second number and if its first digit is out of the code range of said five categories, returning to program step f);

h) generating in said memory unit, and displaying in alignment with said second number, a directional graphic character having a tip side oriented from the right to the left and pointing at said second number;

i) inputting and displaying via said I/O unit, and entering into said memory unit, a user-defined third number in alignment with said graphic character;

j) checking said third number and if its first digit is out of the code range of said five categories, returning to program step i);

k) assembling a directional posting record in the form "the first number, the second number, the directional graphic character, the third number";

l) storing said directional posting record in said journal file;

m) returning to program step d); and further comprising the steps of loading instructions from said data transcription software into said memory unit; and executing said program steps, whereby the computer in program steps d), f) and i) prompts the user via said I/O unit to input and enter a monetary amount, a destination account number and a source account number;

in program step h) displays the directional graphic character that visually indicates the predetermined direction of flow of money between the source and destination account numbers; and in the directional posting record assembled in program step k), the second number pointed at by said tip side designates the debit account and the third number designates the credit account number.

4. A method as defined in claim 3, wherein said improved data transcription software includes further instructions for assembling a descriptive directional code in the form "a descriptive account name assigned to said second number, the directional graphic character, a descriptive account name assigned to said third number";

comparing the first and second code digits of each of said second and third numbers with correlated account names from said account list file and, if no name is detected for one of said numbers, generating for said one number a temporary account name including the reference number and a temporary mark, and inserting the temporary account name into said descriptive directional code.

* * * * *